(12) United States Patent
Bartos et al.

(10) Patent No.: US 8,042,670 B2
(45) Date of Patent: Oct. 25, 2011

(54) SELECTABLE ONE-WAY CLUTCH WITH RADIAL INTEGRATED FORWARD/REVERSE ROCKERS

(75) Inventors: Andrew L. Bartos, Clarkston, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 423 days.

(21) Appl. No.: 12/271,987

(22) Filed: Nov. 17, 2008

(65) Prior Publication Data

US 2010/0122883 A1    May 20, 2010

(51) Int. Cl.
   *F16D 41/08*    (2006.01)
(52) U.S. Cl. .............................. 192/43.1; 192/46; 192/47
(58) Field of Classification Search .................. 192/43.1
   See application file for complete search history.

(56) References Cited

U.S. PATENT DOCUMENTS

| | | | | |
|---|---|---|---|---|
| 5,927,455 A | * | 7/1999 | Baker et al. | 192/36 |
| 5,967,277 A | * | 10/1999 | Walter | 192/43.1 |
| 5,992,592 A | * | 11/1999 | Showalter | 192/43.1 |
| 6,244,965 B1 | * | 6/2001 | Klecker et al. | 464/81 |
| 2006/0278487 A1 | * | 12/2006 | Pawley et al. | 192/43.1 |
| 2007/0278061 A1 | | 12/2007 | Wittkopp et al. | |
| 2008/0169165 A1 | | 7/2008 | Samie et al. | |
| 2008/0223681 A1 | | 9/2008 | Stevenson et al. | |
| 2009/0266667 A1 | * | 10/2009 | Samie et al. | 192/43.1 |

FOREIGN PATENT DOCUMENTS

WO    98/10203 A1    3/1998

* cited by examiner

*Primary Examiner* — Richard M. Lorence
(74) *Attorney, Agent, or Firm* — Quinn Law Group, PLLC (57) ABSTRACT

A selectable one-way clutch assembly (SOWC) includes a first race, a second race, a plurality of rockers, and a selector ring. The first race and the second race each surround the first axis. Each of the rockers selectively hold torque in a rotational direction to establish a clutch operating mode. The selector ring defines a plurality of windows and is configured to rotates about the first axis to align at least one of the windows to establish one of the plurality of different clutch operating modes. The SOWC is engaged by rotating the selector ring about the first axis to align at least one of windows in a predetermined manner. Alignment allows at least one of the rockers to engage the second race in a radial direction to hold torque in at least one rotational direction.

13 Claims, 5 Drawing Sheets

SELECTABLE ONE-WAY CLUTCH WITH RADIAL INTEGRATED FORWARD/REVERSE ROCKERS

TECHNICAL FIELD

The present invention relates to a selectable one-way clutch for holding torque in either rotational direction.

BACKGROUND OF THE INVENTION

In various mechanical devices, and particularly within automatic vehicle transmissions, specialized overrunning or one-way clutching devices are used to produce a one-way driving connection between the respective input and output clutch races. Specifically, a one-way clutch is capable of transmitting torque when the rotation of one race with respect to the other race is in one direction, with the clutch "overrunning" or freewheeling when the rotational direction is reversed.

The relative shape and orientation of the input and output races may vary depending on clutch design. Certain one-way clutches have input and output races that are oriented in a radially concentric manner with respect to each other. Alternately, the confronting or mating faces of the input and output races have a planar orientation or relationship. A mechanism that is used to lock a typical one-way clutch is varied, but may include one or more torque-transmitting elements such as rollers, sprags, rockers, or struts that are positioned between the input and output races. Depending on the particular type or style of the one-way clutch and the direction of rotation, each race may contain unique surface features suitable for engaging one or more of these torque transmitting elements in order to selectively enable various clutch operating modes.

The operating modes of a basic one-way clutch are a "locked" mode in one rotational direction, and a "freewheel" mode in the opposite rotational direction. In a basic one-way clutch, the operating mode is determined by the direction of torque being applied to the input race.

SUMMARY OF THE INVENTION

A selectable one-way clutch assembly (SOWC) includes a first race, a second race, a plurality of rockers, and a selector ring. The first race and the second race each surround the first axis. The rockers are each configured to selectively hold torque in one of a first and a second rotational direction to establish one of a plurality of different clutch operating modes. The selector ring defines a plurality of windows, the selector ring configured for rotating about the first axis to thereby position at least one of the plurality of windows relative to the rockers to establish one of the plurality of different clutch operating modes. The SOWC is engaged by rotating the selector ring about the first axis to thereby align the at least one of the plurality of windows in a predetermined manner. Alignment of the windows allows at least one of the rockers to engage the second race in a radial direction with respect to the first axis to hold torque in at least one rotational direction.

A selectable one-way clutch assembly (SOWC assembly) includes a first race, a second race, a plurality of rockers, a plurality of biasing devices, and a selector ring. The first race and the second race each surround a first axis. The first race defines a plurality of rocker pockets. The rockers are disposed within the respective rocker pocket. Each of the plurality of rockers are configured to selectively hold torque in one of a first and a second rotational direction to establish one of a plurality of different clutch operating modes. The biasing devices are disposed within a respective rocker pocket and are each configured to bias the respective rocker radially toward the first axis. The selector ring defines a plurality of windows. The selector ring is configured to rotate about the first axis to thereby align at least one of the plurality of windows relative to the rockers to establish one of the plurality of different clutch operating modes. The SOWC assembly is engaged by rotating the selector ring about the first axis to thereby align the at least one of the plurality of windows in a predetermined manner. Alignment of the window allows at least one of the rockers to engage the second race in a radial direction with respect to the first axis to hold torque in at least one rotational direction.

A selectable one-way clutch assembly (SOWC assembly) includes a first race, a second race, a plurality of rockers, a biasing device, and a selector ring. The first race and the second race each surround a first axis. The first race defines a plurality of rocker pockets. A second race defines a plurality of notches. The rockers are disposed within a respective one of the rocker pockets. Each of the plurality of rockers are configured to selectively hold torque in one of a first and a second rotational direction to establish one of a plurality of different clutch operating modes. The biasing devices are disposed within a respective rocker pocket and are each configured to bias the respective rocker radially toward the first axis such that the respective rocker rotates about a second axis. The selector ring defines a plurality of windows. The selector ring is configured to rotate about the first axis to thereby align at least one of the plurality of windows with at least one of the rockers to establish one of the plurality of different clutch operating modes. The SOWC assembly is engaged by rotating the selector ring about the first axis to align the at least one of the plurality of windows with at least one of the rockers. Alignment of the window allows at least one of the rockers to engage a respective one of the notches that are defined in the second race to hold torque in at least one rotational direction.

The increased complexity of power transmitting mechanisms has led to a class of selectable one-way clutches, henceforth referred to as SOWCs. A SOWC is similar to a basic one-way clutch in operation as described above. However, as the name implies, SOWCs are further capable of producing a driving connection between an input and an output race in one or both rotational directions, and/or are also able to freewheel in one or both rotational directions as needed.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
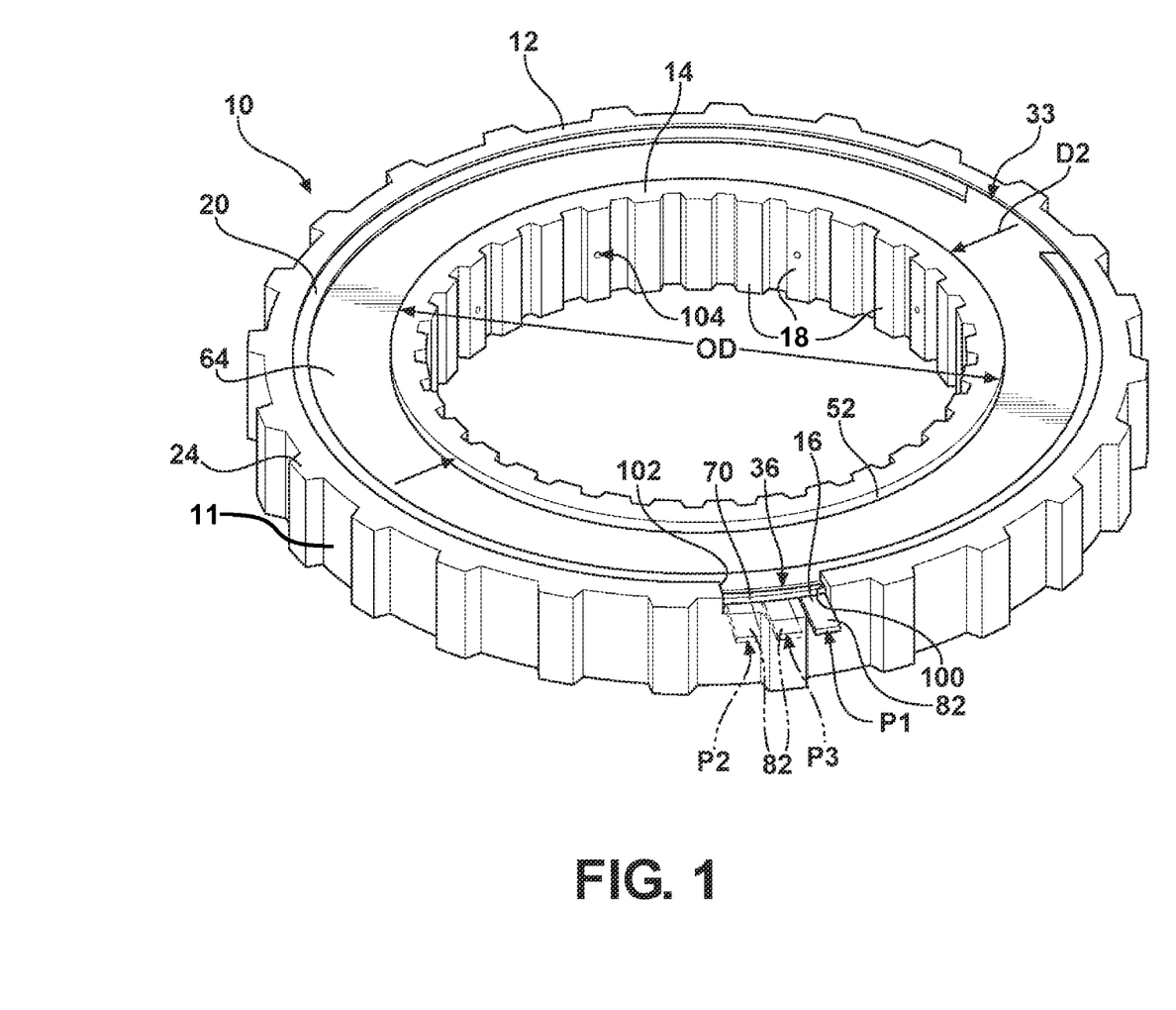
FIG. 1 is a perspective top view of a selectable one-way clutch having integrated forward and reverse radial rockers.

Referring to the drawings, wherein like reference numbers refer to like components, a selectable one-way clutch 10, hereinafter referred to as a SOWC 10, is shown in FIG. 1. The SOWC 10 may be used in a transmission (not shown) for selectively, operatively interconnecting an input and an output of the transmission.

Figure 2:
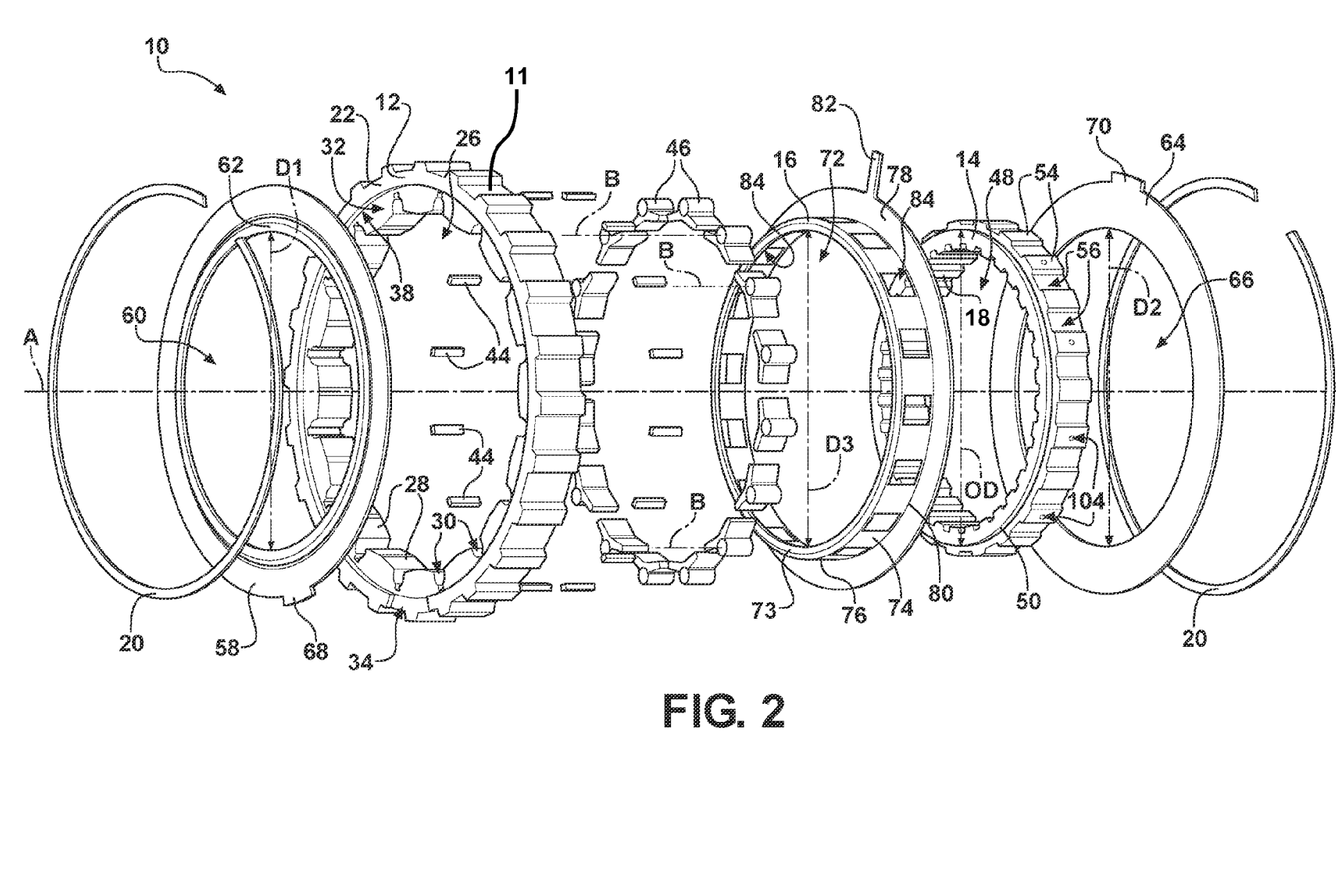
FIG. 2 is an exploded schematic perspective view of the selectable one-way clutch of FIG. 1.

The SOWC 10 extends about a first axis A, as shown in FIG. 2. The SOWC 10 includes a first race or a pocket ring 12, a second race or a notch ring 14, and a selector ring 16. Each of the rings 12, 14, 16 extend about the first axis A. For clarity, the first and second races 12, 14 are referred to hereinafter as the pocket ring 12 and the notch ring 14, respectively. The pocket ring 12 may include a plurality of externally-projecting spline teeth 11 that are drivingly engageable or otherwise mateable with mating spline teeth (not shown) of a stationary reaction member, e.g., a case (not shown) of the transmission. The notch ring 14 may include a plurality of equally spaced, internally-projecting teeth or splines 18 that are drivingly engageable or mateable with opposing teeth or splines of a torque input device (not shown). The SOWC 10 may include two retaining rings 20 for retaining the rings 12, 14, 16 within the SOWC 10.

Referring again to FIG. 2, the SOWC 10 is shown in an exploded view. The pocket ring 12 extends about the first axis A and includes a first face 22 opposing a second face 24. A first opening 26 is defined through the pocket ring 12 along the first axis A. An inwardly facing internal face 28 surrounds the first opening 26. The internal face 28 defines a plurality of equally spaced wells or rocker pockets 30 that are circumferentially spaced about the first opening 26. The first face 22 and the second face 24 each define an axially extending first bore 32 that surrounds the first opening 26. The first face 22 also defines an axially extending notch 34 that opens to the first bore 32. The second bore 33 is adapted for rotatably positioning the selector ring 16. The second face 24 defines an axially extending radial slot 36 that opens to the respective first bore 32. A circumferential retaining groove 38 is defined in each of the first bores 32, proximate each face 22, 24. Each of the circumferential retaining grooves 38 radially surrounds the first axis A. The circumferential retaining grooves 38 are adapted to hold or retain a respective snap ring or retaining ring 20 therein.

Referring to FIGS. 5-8, each of the rocker pockets 30 includes a base recess 40 and a spring recess 42. The base recess 40 opens to the first opening 26 and the spring recess 42 opens to the base recess 40. A biasing device 44 may be disposed in each spring recess 42. The biasing device 44 may be a spring. In the embodiment shown in the Figures, the biasing device 44 is an accordion style compression spring 44. Each spring 44 is configured to exert a sufficient spring force on an opposing rocker 46 that is at least partially disposed in the base recess 40 to thereby actuate or move the rocker 46 into engagement with the notch ring 14, as described in more detail below. While the accordion style compression springs 44 are preferred, an alternate energy storage device, such as a helical compression spring, and the like, may also be used as known to those skilled in the art. It should also be appreciated that the shape of the spring recess 42 would be adapted to the profile of the chosen biasing device 44 in order to best accommodate the shape of the biasing device 44.

Figure 3:
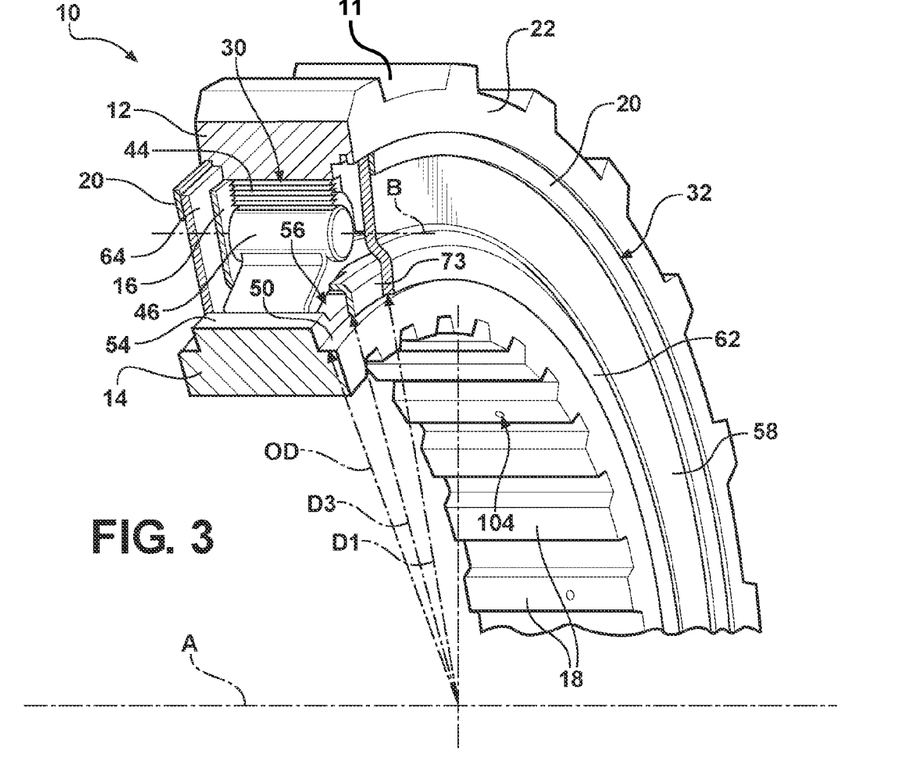
FIG. 3 is a schematic perspective cross-sectional view of the selectable one-way clutch of FIGS. 1, and 2, partially cutaway, illustrating a rocker in a forward locked position.

Referring to FIGS. 2 and 3, the notch ring 14 extends about the first axis A. The notch ring 14 defines a second opening 48 surrounding the first axis A. The notch ring 14 is disposed within the first opening 26 of the pocket ring 12. The notch ring 14 includes a first rim 50 and a second rim 52, opposing the first rim 50. Each rim 50, 52 extends or protrudes from opposing sides of the notch ring 14 and surrounds the second opening 48. Each rim 50, 52 has an outer diameter OD. The internally projecting teeth 18 extend from the notch ring 14 and surround the second opening 48. A plurality of externally projecting notch teeth 54 extend radially from the notch ring 14, opposite the internally projecting teeth 18. The notch teeth 54 are circumferentially spaced about the entire circumference of the exterior of the notch ring 14. A rocker notch 56 is defined between each adjacent notch tooth 54.

Referring to FIGS. 2 and 3, a first retaining plate 58 is disposed within the first bore 32 on the first face 22 of the pocket ring 12. The retaining ring 20 is disposed in the retaining ring groove 38 that is associated with the first face 22 to secure the first retaining plate 58 to the pocket ring 12. The first retaining plate 58 extends about the first axis A and defines a first pilot hole 60 having a first pilot diameter D1. A third rim 62 extends axially from the first retaining plate 58 to surround the first pilot hole 60. Referring to FIGS. 1 and 2, a second retaining plate 64 is disposed in the first bore 32 on the second face 24 of the pocket ring 12. The other retaining ring 20 is disposed in the retaining ring groove 38 that is associated with the second face 24 of the pocket ring 12 to retain the second retaining plate 64 to the pocket ring 12. The second retaining plate 64 defines a second pilot hole 66, having a second pilot diameter D2. In order to maintain concentricity between the pocket ring 12 and the notch ring 14, the first and second pilot diameters D1, D2 are sized such that the outer diameter OD of each of the first and second rims 50, 52 extend through the respective first and second pilot diameters D1, D2 to engage respective the first and second retaining plates 58, 64.

A first tab 68 extends radially from the first retaining plate 58, as shown in FIG. 2. The first tab 68 engages the notch 34 defined in the first face 22 of the pocket ring 12. The first tab 68 is configured to prevent rotation of the first retaining plate 58 relative to the pocket ring 12. Similarly, a second tab 70 extends radially from the second retaining plate 64, as shown in FIGS. 1 and 2. The second tab 70 engages the radial slot 36 defined in the second face 24 of the pocket ring 12. The second tab 70 is configured to prevent rotation of the second retaining plate 64 relative to the pocket ring 12. Additionally, when the retaining plates 58, 64 are secured to the respective faces 22, 24 of the pocket ring 12 with respective retaining rings 20, axial movement of the SOWC 10 and the individual components is restricted along the first axis A.

Referring again to FIG. 2, the selector ring 16 defines a third opening 72 and includes a selector ring web 74 that radially surrounds the third opening 72. The selector web 74 surrounds the first axis A. A lip 73 extends radially inward from a first edge 76 of the selector web 74 to radially surround the first axis A. The third opening 72 within the lip 73 has a third pilot diameter D3. To further maintain concentricity, the outer diameter OD of the first rim 50 of the notch ring 14 is sized such that the first rim 50 extends through the third pilot diameter D3 of the selector ring 16 and then the first pilot diameter D1 of the first retaining plate 58, as shown in FIG. 3. Therefore, the third rim 62 is axially disposed against the lip 73. A selector band 78 extends radially outward from a second edge 80, opposite the first edge 76, to radially surround the third opening 72. A selector lever 82 extends radially outward from the selector band 78. Referring generally to FIG. 1, the selector lever 82 is rotatably disposed within the radial slot and configured to selectively rotate about the first axis A between a first position P1, a second position P2, and a neutral position P3, as will be described in more detail below. The ring web 74 defines a plurality of equally spaced windows 84 that are circumferentially spaced about the third opening 72, as shown in FIG. 2. The selector ring 16 is disposed within the first opening 26 of the pocket ring 12 and the notch ring 14 is disposed in the third opening 72 of the selector ring 16. Therefore, the ring web 74 is positioned between the internal face 28 of the pocket ring 12 and the rocker notch 56 and notch teeth 54 of the notch ring 14. The quantity of the windows 84 is preferably equal to the number of rocker pockets 30 defined in the pocket ring 12. Each window 84 is configured to selectively allow the rocker 46 to contact the notch teeth 54 on the other side of the web ring 74, as shown in FIGS. 2 and 3.

Figure 4:
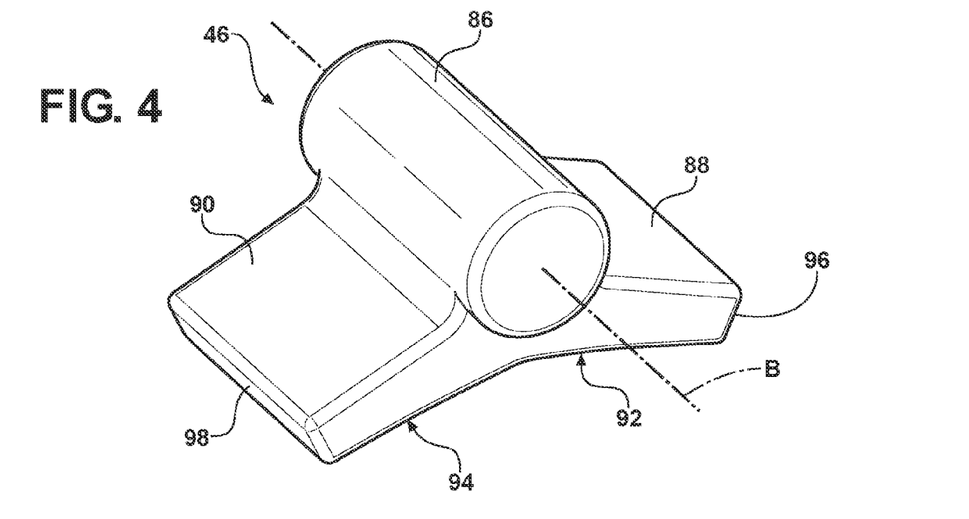
FIG. 4 is a schematic perspective view of the rocker according to the invention.

Referring to FIG. 4, the rocker 46 may be symmetrically formed about a second axis of rotation B. The second axis B of each rocker 46 is in spaced and generally parallel relationship to the first axis A. The rocker 46 includes a cylinder 86 that extends along the second axis B. A first arm 88 and a second arm 90 extend radially outward from the cylinder in generally opposing directions. The first arm 88 extends along an inward first surface 92 and the second arm 90 extends along an inward second surface 94 such that the inward first surface 92 of the first arm 88 and the inward second surface 94 of the second arm 90 form a general V-shape therebetween. The first arm 88 extends to a first free end 96 and the second arm 90 extends to a second free end 98. The arms 88, 90 may taper from the cylinder 86 to the respective free ends 96, 98 to reduce bending stresses on the rocker 46. The free ends 96, 98 may be substantially identical. Once the rocker 46 is disposed in the respective pocket 30 within pocket ring 12, "reverse end" and "forward end" labels are fixed, with the labels describing the orientation of the rocker 46 relative to the clutch rotational direction. For illustrative purposes, the first free end 96 is referred to hereinafter as forward end 96, and the second free end 98 is referred to hereinafter as reverse end 98.

Figure 5:
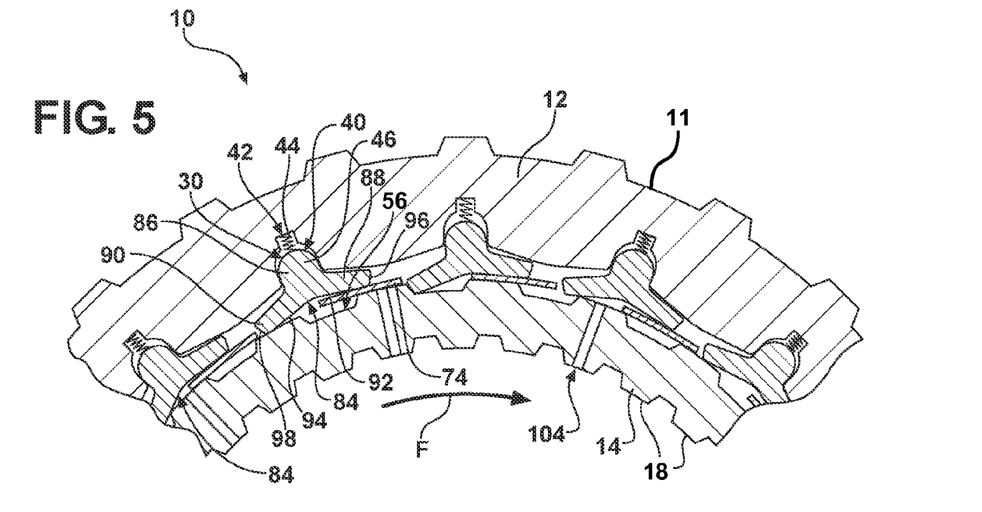
FIG. 5 is a fragmentary schematic cross-sectional side view of the selectable one-way clutch illustrating the rockers in the forward locked position.
Figure 6:
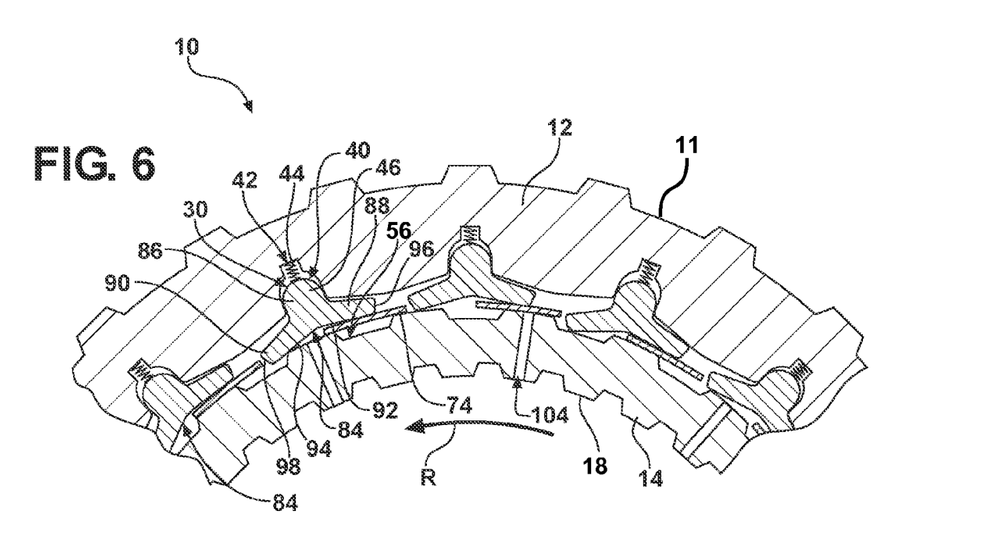
FIG. 6 is a fragmentary schematic cross-sectional side view of the selectable one-way clutch illustrating the rockers in the forward freewheel position.
Figure 8:
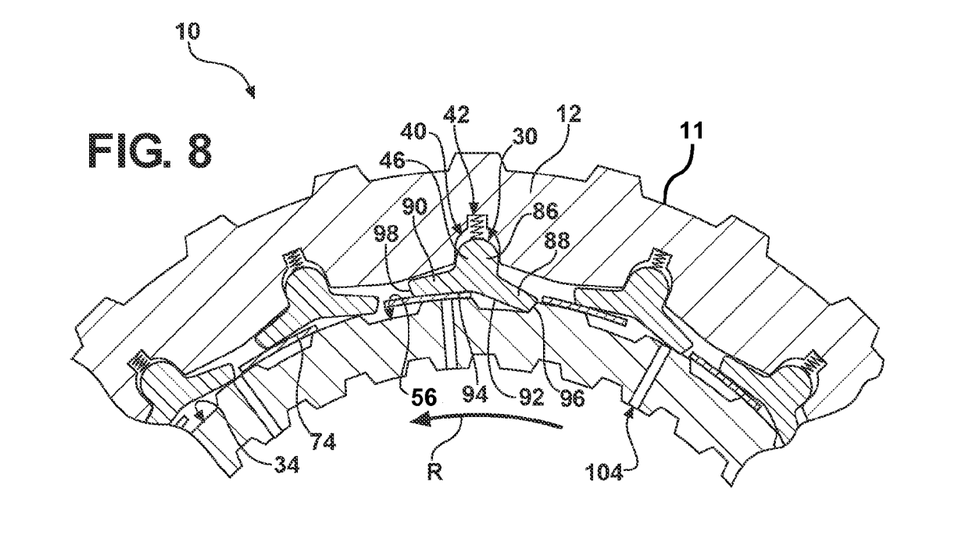
FIG. 8 is a fragmentary schematic cross-sectional side view of the selectable one-way clutch illustrating the rockers in a reverse locked position.

Referring to FIG. 3, each rocker pocket 30 in the pocket ring 12 contains one of the rockers 46. Each rocker 46 is rotatable about the second axis B within the respective rocker pocket 30. Additionally, each rocker 46 may have the ability to move radially inward relative to the first axis A of the SOWC 10 against a force of the biasing device 44, as illustrated in FIGS. 2 and 3. Two diametrically opposed rockers 46 may simultaneously engage diametrically opposed notches 56 in the notch ring 14 to cancel reaction forces generated by the engagement of rocker 46 with the respective notch 56. The rocker 46 rotates or may rock within the rocker pocket 30 about the second axis B. The force provided by the biasing device 44 may also move the rocker 46 out of the base recess 40 of the rocker pocket 30. Depending on the number of notches 56 in the notch ring 14 and the number of rockers 46, either the forward end 96 or the reverse end 98 of one or more of the rockers 46 will be positioned to engage a respective one of the notches 56 in the notch ring 14. Engagement of one of the ends 96, 98 of the rockers 46 within the respective notches 56 in the notch ring 14 determines an operating mode of the transmission, as discussed in more detail below. The inward first surface 92 of the first arm 88 of the rocker 46 may have a curvature that is generally concentric to the first axis A of rotation of the notch ring 14 when the reverse end 98 of rocker 46 is fully engaged with a respective notch 56 on the notch ring 14, as shown in FIGS. 5 and 6. Similarly, the inward second surface 94 of the second arm 90 of the rocker 46 may have a curvature that is generally concentric to the first axis A of rotation of the notch ring 14 when the forward end 96 of rocker 46 is fully engaged within the respective notch 56 on notch ring 14, as shown in FIG. 8.

The selector ring 16 is rotatable relative to the pocket ring 12 and the rockers 46 about the first axis A. This means that the selector ring web 74 rotates about the first axis A and relative to the internal face 28 of the pocket ring 12. The selector ring 16 may rotate using an electric solenoid (not shown), a hydraulically-actuated device (not shown), or any other mechanism suitable for selectively actuating or rotating the selector ring 16 relative to the pocket ring 12. The selector lever 82 limits the amount the selector ring 16 can rotate about the first axis A, relative to the pocket ring 12 and the rockers 46.

Referring again to FIG. 5, the direction of rotation of the notch ring 14 relative to the pocket ring 12 and the rockers 46 is illustrated with the selector web ring 74 rotated to the first position P1 or a "forward locked" position. When the selector web ring 74 is in the forward locked position, the notch ring 14 is prevented from rotating in a forward direction, as indicated by arrow F, when torque is acting on the notch ring 14 in the direction of the arrow F. The cylinder 86 of each rocker 46 is disposed within the respective rocker pocket 30 and is biased out of the rocker pocket 30 and toward the notch 56 by the biasing device 44. To achieve the forward locked position, the selector ring 16 is actuated, moved, or otherwise rotated about the first axis A in the forward direction, as indicated by the arrow F. The selector ring 16 may be rotated about the first axis A until the selector lever 82 contacts a forward-most end 100 of the radial slot 36 in the pocket ring 12, corresponding to the first position P1, as shown in FIG. 1 to prevent the selector ring 16 from further rotation in the forward direction. After the selector lever 82 contacts the forward-most end 100 of the radial slot 36, at least one radial window 84 is at least partially aligned with the corresponding reverse end 98 of at least one of the rockers 46. Therefore, the reverse end 98 is biased into engagement with the respective notch 56 by the respective biasing device 44. As a result of the engagement between the reverse end 98 of at least one of the rockers 46 and the respective notches 56 of the notch ring 14, the notch ring 14 is prevented from rotating relative to the pocket ring 12 in the direction of the arrow F. This means that a force may be transmitted in the direction of the arrow F between the pocket ring 12 and the notch ring 14.

Referring to FIG. 6, a "forward freewheel" position is shown. In the forward freewheel position, the notch ring 14 may rotate in a reverse position, as represented by arrow R. In the forward freewheel position, the selector ring 16 is still in the first position P1. However, in the forward freewheel position, FIG. 5 illustrates how the notch ring 14 may rotate relative to the pocket ring 12 in the direction indicated by the arrow R when torque is applied to the notch ring 14 in the direction of the arrow R. Therefore, the reverse end 98 of the rocker 46 is free to move away from engagement with mating notch 56 by pivoting about the reverse end 98 that contacts the selector ring web 74 as the notch teeth 54 rotate relative to the rocker 46 to lift the second arm 90 out of the notch 56. In this manner, the notch ring 14 is free to rotate in the direction represented by the arrow R. When this occurs, the biasing device 44 exerts a moment on the rocker 46, which urges the reverse end 98 of the rocker 46 that is aligned with the respective window 84 out of the respective notch 56.

Figure 7:
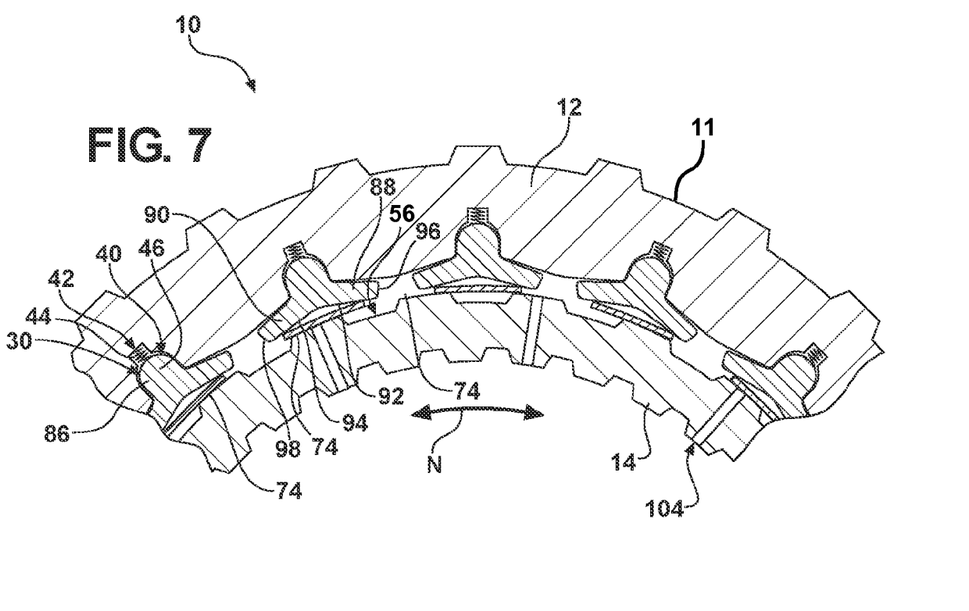
FIG. 7 is a fragmentary schematic cross-sectional side view of the selectable one-way clutch illustrating the rockers in a neutral position.

Referring to FIG. 7, a "neutral" position is shown. A neutral position P3 may be a position in which both ends 96, 98 of rocker 46 are prevented from engaging any of the notches 56 in the notch ring 14. The neutral position P3 is achieved by moving the selector lever 82 to a center of the radial slot 36 in the pocket ring 12. As a result, the selector ring web 74 moves to the center of the cylinder 86 of the rocker 46. The rocker 46 is forced to rotate to a position at which both of the ends 96, 98 are generally equidistant from notch teeth 54. When the ends 96, 98 are positioned this way, no force may be transmitted between the pocket ring 12 and notch ring 14 because each end 96, 98 is prevented from entering the notches 56. Therefore, the notch ring 14 rotates freely in both rotational directions as shown by the arrow N.

Referring to FIG. 8, the direction of rotation of the notch ring 14 relative to the pocket ring 12 and the rockers 46 is illustrated with the selector web ring 74 rotated to the first position P1 or a "reverse locked" position. When the selector web ring 74 is in the forward locked position, the notch ring 14 is prevented from rotating in a reverse direction, as indicated by arrow R, when torque is acting on the notch ring 14 in the direction of the arrow R. The cylinder 86 of each rocker 46 is disposed within the respective rocker pocket 30 and is biased out of the rocker pocket 30 and toward the notch 56 by the biasing device 44. To achieve the reverse locked position, the selector ring 16 is actuated, moved, or otherwise rotated about the first axis A in the reverse direction, as indicated by the arrow R. The selector ring 16 may be rotated about the first axis A until the selector lever 82 contacts a rear-most end 102 of the radial slot 36 in the pocket ring 12, corresponding to the second position P2, as shown in FIG. 1, to prevent the selector ring 16 from further rotation in the reverse direction. After the selector lever 82 contacts the rear-most end 102 of the radial slot 36, at least one radial window 84 is at least partially aligned with the corresponding reverse end 98 of at least one of the rockers 46. Therefore, the forward end 96 is biased into engagement with the respective notch 56 by the respective biasing device 44. As a result of the engagement between the forward end 96 of at least one of the rockers 46 and the respective notches 56 of the notch ring 14, the notch ring 14 is prevented from rotating relative to the pocket ring 12 in the direction of the arrow R. This means that a force may be transmitted in the direction of the arrow R between the pocket ring 12 and the notch ring 14.

During the forward or reverse freewheeling modes, a series of radial oil passages 104 may be defined in the notch ring 14, as shown in FIGS. 1-3 and 5-8. The oil passages 104 are adapted to provide damping and lubrication to the rockers 46 as they move in and out of the notches 56 defined in the notch teeth 54. The radial oil passages 104 may also provide lube oil and cooling to part surfaces moving relative to each other during the freewheeling modes. A similar arrangement of lubrication holes 104 may also be incorporated into the pocket ring 12 to act as exhaust ports to improve oil flow and cooling.

While the best modes for carrying out the invention have been described in detail, those familiar with the art to which this invention relates will recognize various alternative designs and embodiments for practicing the invention within the scope of the appended claims.

The invention claimed is:

1. A selectable one-way clutch assembly (SOWC) comprising:
   a first race surrounding a first axis;
   a second race surrounding said first axis;
   a plurality of rockers each configured for selectively holding torque in one of a first and a second rotational direction to establish one of a plurality of different clutch operating modes;
   wherein said first race defines a plurality of pockets and each of said rockers are at least partially operatively disposed in a respective one of said pockets; and
   a selector ring defining a plurality of windows, said selector ring configured for rotating about said first axis to thereby align at least one of said plurality of windows relative to at least one of said plurality of rockers to establish one of said plurality of different clutch operating modes;
   wherein said plurality of rockers are operatively disposed between said first race and said selector ring; and
   a biasing device operatively disposed in each of said rocker pockets between said first race and a respective one of said rockers and configured to bias said respective rocker in a radial direction toward said first axis;
   wherein at least one of said plurality of rockers selectively moves radially through a respective one of said windows and into engagement with said second race in response to rotating said selector ring about said first axis to align said at least one of said plurality of windows in a predetermined manner;
   wherein the SOWC is engaged by rotating said selector ring about said first axis to thereby align said at least one of said plurality of windows in said predetermined manner such that at least one of said rockers engages said second race in the radial direction with respect to said first axis to hold torque in at least one rotational direction.

2. A SOWC, as set forth in claim 1, wherein the SOWC is disengaged by rotating said selector ring about said first axis to thereby align said plurality of windows in a predetermined manner such that each of said rockers disengages said second race in a radial direction with respect to said first axis to allow a freewheeling of torque in both rotational directions.

3. A SOWC, as set forth in claim 1, wherein each of said plurality of rockers are rotatably disposed within said respective pocket about a second axis and configured to rotate about said second axis to radially engage said second race.

4. A SOWC, as set forth in claim 3, wherein each of said plurality of rockers includes a cylinder extending along said second axis;
   wherein a first arm and a second arm extend radially outward from said cylinder in generally opposing directions;
   wherein at least one of said plurality of rockers selectively rotates about said second axis such that one of said arms engages said second race.

5. A SOWC, as set forth in claim 4, wherein said first arm extends along an inward first surface to a first free end and said second arm extends along an inward second surface to a second free end;
   wherein at least one of said plurality of rockers selectively rotates about said second axis such that one of said ends engages said second race.

6. A SOWC, as set forth in claim 5, wherein said inward first surface and said inward second surface form a general V-shape.

7. A SOWC, as set forth in claim 5, wherein each of said arms tapers from said cylinder to said respective end.

8. A SOWC, as set forth in claim 3, wherein said second race includes a plurality of notch teeth extending radially from said second race and circumferentially surrounding said first axis;
   wherein a rocker notch is defined between each adjacent pair of said notch teeth;
   wherein one of said free ends of at least one of said rockers moves selectively radially to engage said respective rocker notch of said second race.

9. A SOWC, as set forth in claim 8, wherein a quantity of said rockers is equal to a quantity of said rocker notches and to a quantity of said rocker pockets.

10. A SOWC, as set forth in claim 1, wherein said biasing device is a spring.

11. A SOWC, as set forth in claim 1, wherein said selector ring includes a radially extending selector lever and said first race includes a first face opposing a second face;
   wherein said second face defines a radial slot;
   wherein said selector lever is disposed in said radial slot and rotatable about said first axis between a first position and a second position to thereby align at least one of said plurality of windows in a predetermined manner to establish one of said plurality of different clutch operating modes.

12. A selectable one-way clutch assembly (SOWC assembly) comprising:
   a first race surrounding a first axis and defining a plurality of rocker pockets;
   a second race surrounding said first axis;
   a plurality of rockers disposed within said respective rocker pocket;
   wherein each of said plurality of rockers are configured for selectively holding torque in one of a first and a second rotational direction to establish one of a plurality of different clutch operating modes;
   a plurality of biasing devices disposed within said respective rocker pocket between said first race and a respective one of said plurality of rockers and configured to bias said respective rocker radially toward said first axis; and
   a selector ring defining a plurality of windows, said selector ring configured for rotating about said first axis to thereby position at least one of said plurality of windows relative to at least one of said plurality of rockers to establish one of said plurality of different clutch operating modes;
   wherein the SOWC assembly is engaged by rotating said selector ring about said first axis to thereby align said at least one of said plurality of windows in a predetermined manner such that at least one of said rockers engages said second race in a radial direction with respect to said first axis to hold torque in at least one rotational direction.

13. A selectable one-way clutch assembly (SOWC assembly) comprising:
   a first race surrounding a first axis and defining a plurality of rocker pockets;
   a second race surrounding said first axis and defining a plurality of notches;
   a plurality of rockers disposed within a respective one of said rocker pockets;
   wherein each of said plurality of rockers are configured for selectively holding torque in one of a first and a second rotational direction to establish one of a plurality of different clutch operating modes;
   a plurality of biasing devices disposed within a respective one of said rocker pockets between said first race and a respective one of said plurality of rockers and configured to bias said respective rocker radially toward said first axis such that said respective rocker rotates about a second axis; and
   a selector ring defining a plurality of windows, said selector ring configured for rotating about said first axis to thereby align at least one of said plurality of windows with at least one of said rockers to establish one of said plurality of different clutch operating modes;
wherein the SOWC assembly is engaged by rotating said selector ring about said first axis to thereby align said at least one of said plurality of windows with at least one of said rockers such that said at least one of said rockers engages a respective one of said notches defined in said second race to hold torque in at least one rotational direction.

* * * * *